US006546798B1

United States Patent
Waters et al.

(10) Patent No.: US 6,546,798 B1
(45) Date of Patent: Apr. 15, 2003

(54) MICRO-ELECTRO-MECHANICAL SYSTEMS RESONANT OPTICAL GYROSCOPE

(75) Inventors: Richard L. Waters, San Diego, CA (US); Monti E. Aklufi, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/892,301

(22) Filed: Jun. 26, 2001

Related U.S. Application Data

(63) Continuation-in-part of application No. 09/808,570, filed on Mar. 14, 2001.

(51) Int. Cl.[7] .............................. G01P 3/00; G01C 19/72
(52) U.S. Cl. ..................................... 73/504.01; 356/460
(58) Field of Search ......................... 73/504.01, 504.02, 73/504.04, 504.08, 514.02, 514.27; 356/459, 460, 477, 454

(56) References Cited

U.S. PATENT DOCUMENTS

| | | | |
|---|---|---|---|
| 4,315,693 A | * | 2/1982 | Waler ........................ 356/350 |
| 4,989,979 A | | 2/1991 | Buckman |
| 5,327,212 A | * | 7/1994 | Ficalora et al. ............. 356/350 |
| 5,915,275 A | | 6/1999 | Cardarelli et al. |
| 5,992,233 A | | 11/1999 | Clark |
| 6,067,858 A | | 5/2000 | Clark et al. |
| 6,446,217 B1 | * | 9/2002 | Carroll et al. .............. 713/500 |

OTHER PUBLICATIONS

Waters, R. L. et al., "Micromachanical Optoelectronic Switch and Amplifier (MIMOSA)", *IEEE Journal of Selected Topics in Quantum Electronics*, vol. 5, No. 1, Jan./Feb. 1999, pp. 33–35.

* cited by examiner

*Primary Examiner*—Helen Kwok
(74) *Attorney, Agent, or Firm*—Peter A. Lipovsky; James A. Ward; Michael A. Kagan

(57) ABSTRACT

A gyroscope is based upon the integration of an optical resonant cavity and a photodiode to detect minute perturbations due to angular forces. A Fabry-Perot cavity is created from two parallel semitransparent mirrors used in conjunction with a monochromatic light source. One mirror is fixed while the other is allowed to rotate with respect to the first mirror. A resonant cavity is thereby formed on either side of the axis. The gap between the mirrors is set so that light transmission through the mirrors is optimized. Rotation of the mirror from this position causes the distance between the mirrors to be altered and the light transmission on either side of the rotational axis to be change. Photodiodes on these sides sense this change as a change in photo-generated current, enabling the amount of change in rotation to be calculated. The photo-currents can be differentially amplified for sensitivity.

28 Claims, 9 Drawing Sheets

MICRO-ELECTRO-MECHANICAL SYSTEMS RESONANT OPTICAL GYROSCOPE

CROSS-REFERENCE TO RELATED APPLICATION

This application is a continuation-in-part of U.S. patent application Ser. No. 09/808,570 filed Mar. 14, 2001 by inventors Richard L. Waters and Monti E. Aklufi titled "Micro-electro-mechanical Ultra-Sensitive Accelerometer" and incorporated by reference herein.

BACKGROUND OF THE INVENTION

This invention relates generally to perceiving rotation of an object. More specifically, the invention relates to the devices used for making such perceptions. In greater specificity the invention relates to an optical technique for detecting rotation or angular displacement of an object by utilizing the technology known as micro-electro-mechanical systems or "MEMS".

Typical MEMS-based gyroscopes use capacitive pick-offs to detect change in angular acceleration/rotation. This technique, however, is limited in sensitivity. This is particularly true as dimensions of the device are decreased, as capacitance varies linearly with area. One technique to increase the capacitance and thus sensitivity of these designs is to decrease the distance between the two parallel plates that form the capacitor. Decreasing this dimension presents its own problems, as variations in thickness and spacing across the surface of the parallel plates then play a much greater role in other performance shortcomings. Larger parallel plate spacings, on the order of a few microns, are therefore generally utilized to help increase repeatability and percent uniformity. Capacitive techniques result in a passive means of detection, meaning that additional low noise amplification and filtering circuitry must be employed to extract accurate rotational rates. Piezo-electric techniques cannot provide nearly enough sensitivity for many desired applications. Because of low steady-state signal levels, high sensitivity MEMS-based gyroscopes are difficult to realize.

To gain the full potential of MEMS based gyroscopes, significant improvement in sensitivity over the prior-based methods must be made.

SUMMARY OF THE INVENTION

Traditional gyroscope design incorporates a rapidly spinning element. The invention does not use a rapidly spinning component but instead uses a structure that allows the sensing of rotational movement and position of one structure with respect to another. The invention is based upon the integration of an optical resonant cavity and a photodiode. This combination is used to detect minute perturbations due to angular acceleration, such as those that may be generated by the Coriolis Force, perturbations due to constant angular acceleration otherwise known as rotational velocity, and angular displacement of one object with respect to another.

For example, a Fabry-Perot cavity, consisting of two parallel semitransparent mirrors, can be used in conjunction with a light source. One of the two mirrors is fixed in position while the other is allowed to rotate with respect to the first mirror around a fixed rotational axis. A resonant cavity is thereby formed on either side of the axis, though only a single upper and lower mirror are used. If monochromatic light is used to illuminate the upper mirror of the cavity and the distance between the upper and lower mirrors is an integral multiple of half wavelengths of this light, then a resonant condition will exist and the transmission of light through the mirrors will be optimized.

As the upper mirror is rotated, the distance between the two mirrors will become altered. One resonant cavity will "see" a decrease in cavity length while the other will see an equal but opposite increase in cavity length. As the distance between the two mirrors is changed, the light transmitting the mirrors will also be changed. Photodiodes integrated on either side of the torsional/rotational axis are used to sense the change in distance as a change in photo-generated current. By monitoring the change in photocurrent, the amount of change in rotation can be calculated. The photocurrents collected from the two cavities can be differentially amplified to further the sensitivity of the device.

Other objects, advantages and new features of the invention will become apparent from the following detailed description of the invention when considered in conjunction with the accompanied drawings.

DESCRIPTION OF THE INVENTION

The concept for this invention is based upon the integration of an optical resonant cavity and a photosensor to detect minute perturbations due to angular movement such as those that may be generated by the Coriolis Force. For instance, a Fabry-Perot cavity, consisting of two parallel semitransparent mirrors can be used in conjunction with a monochromatic light source. One of the two mirrors is fixed in position while the other is allowed to rotate around a fixed rotational axis that is parallel to and spaced from the fixed mirror. If monochromatic light is used to illuminate the upper mirror of the cavity and the distance between the top and bottom mirrors is an integral multiple of half wavelengths of the source light, a resonant condition will exist and the transmission of light through the mirrors is optimized. By integrating a photodiode under the lower mirror, the light transmitting the cavity can be detected via a photo-generated current. If the distance between the two mirrors changes due to a rotational force, the transmitted light into the photodiodes will be altered. By monitoring the change in photocurrent, the amount of change in rotational velocity can be detected.

Figure 1:
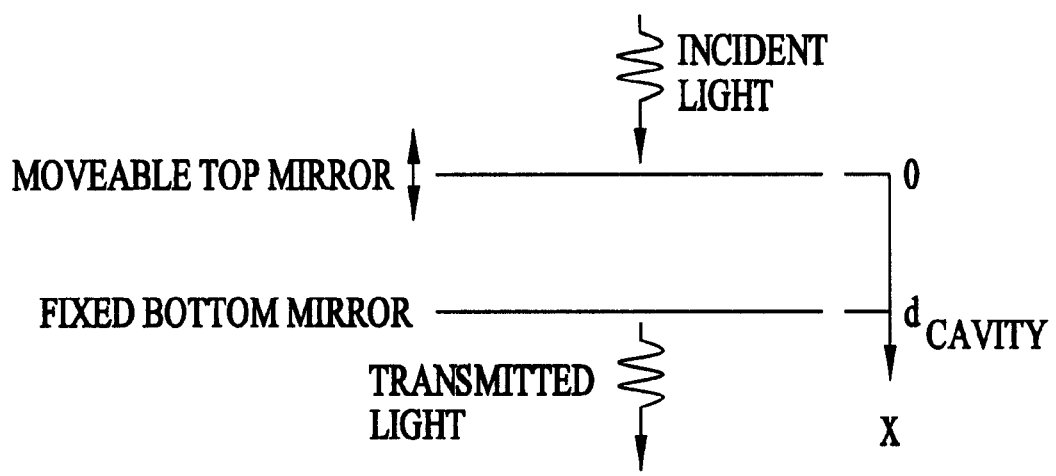
FIG. 1 illustrates the basic concept of a Fabry-Perot etalon.
Figure 2:
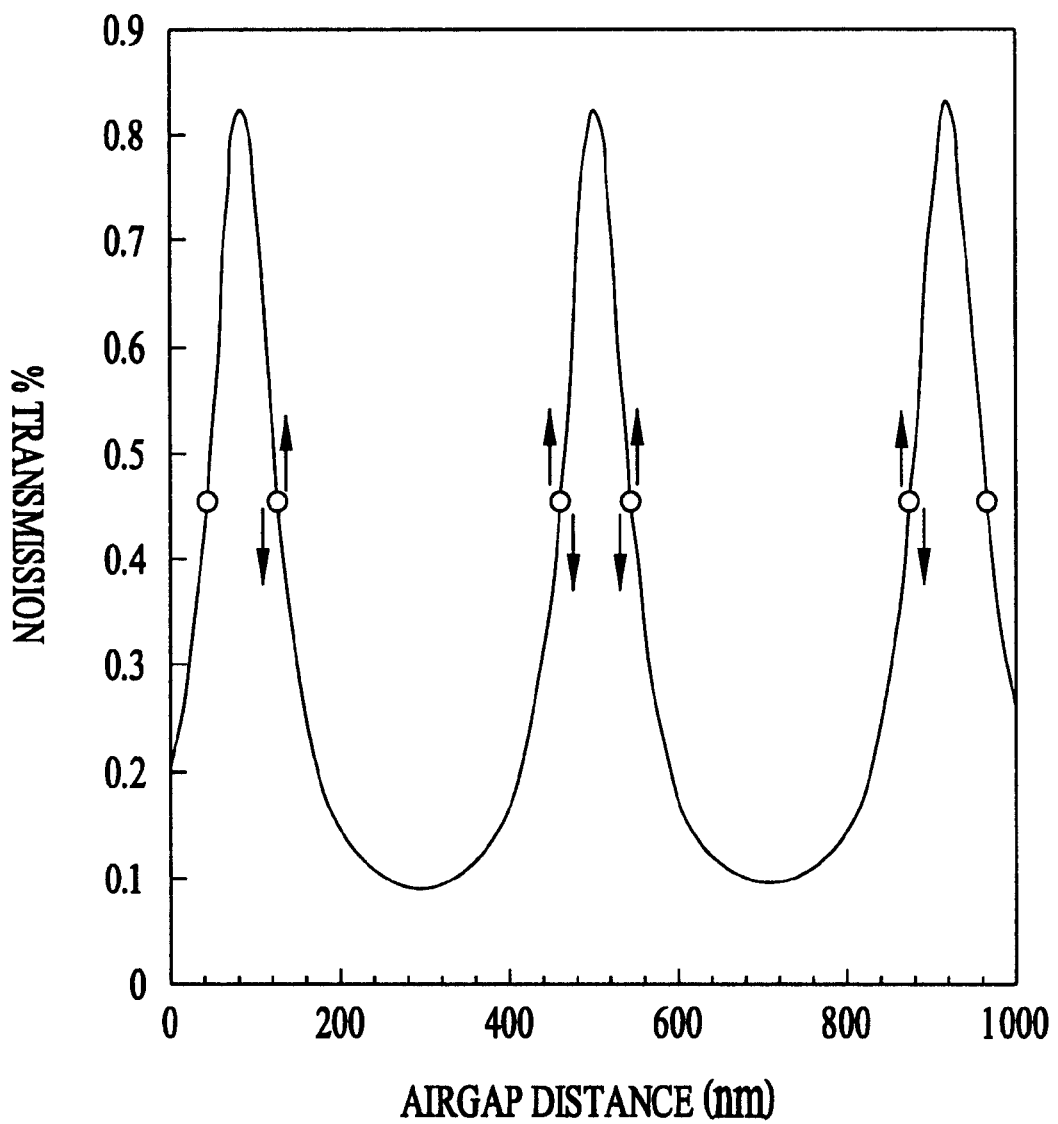
FIG. 2 is a graphical depiction showing an optical resonant cavity's light transmission versus interferometer airgap distance for a given wavelength of light.

FIG. 1 illustrates the basic concept of a Fabry-Perot etalon. It consists of two mirrors separated by some distance, d. One of the mirrors such as the bottom mirror is considered rigidly fixed in position while the other is movable and is attached to a spring of spring constant, k. If the initial distance between the two mirrors is such that light transmission through the etalon is at 0.5*(maximum Transmission−minimum Transmission)+minimum Transmission, as depicted in FIG. 2, the Fabry-Perot etalon may be employed in a differential amplification scheme. Other operating points are, of course, feasible as well.

Figure 3:
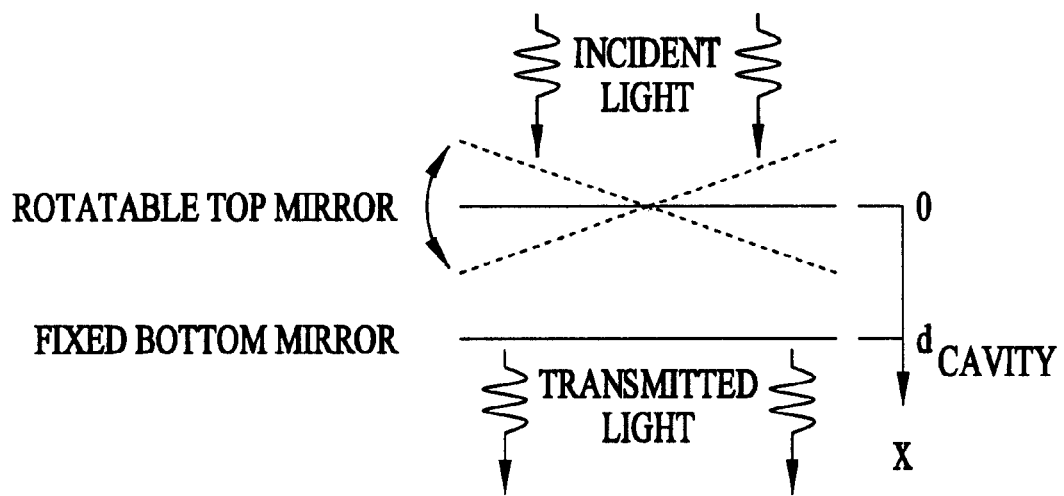
FIG. 3 is a partial side view illustrating basic aspects of the invention.

This scheme can be imagined by having the two mirrors centered about a rotational axis as shown in general in FIG. 3. As the upper mirror rotates, one side moves closer to the bottom mirror while the other moves further from the bottom mirror by an equal amount. The up/down arrows in FIG. 2 depict this movement wherein one side of the upper mirror moves away from the bottom mirror and the other side of the upper mirror moves closer to the bottom mirror.

Figure 4:
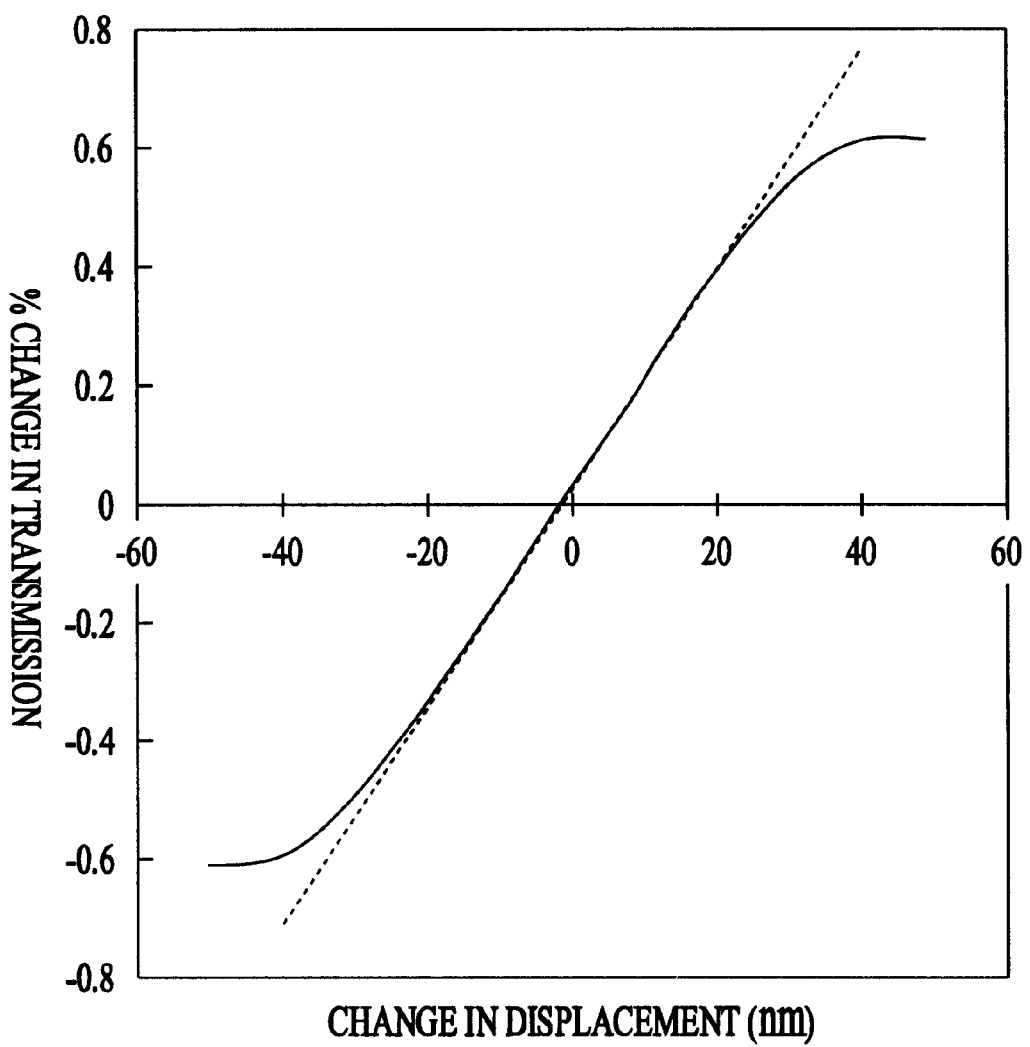
FIG. 4 is the result of numerical simulation demonstrating the differential amplification potential of the invention.

A differential measurement can be made between the transmission of light through the two mirrors as demonstrated in FIG. 4, wherein the transmission of light through one side of the rotating mirror is subtracted from the transmission of light through the other side of the rotating mirror. Besides providing for differential amplification, noise common to both sides of the rotating mirror are reduced. FIG. 4 shows a highly linear response regime in which displacement of a Fabry-Perot mirror due to rotational forces can be differentially amplified.

Figure 5A:
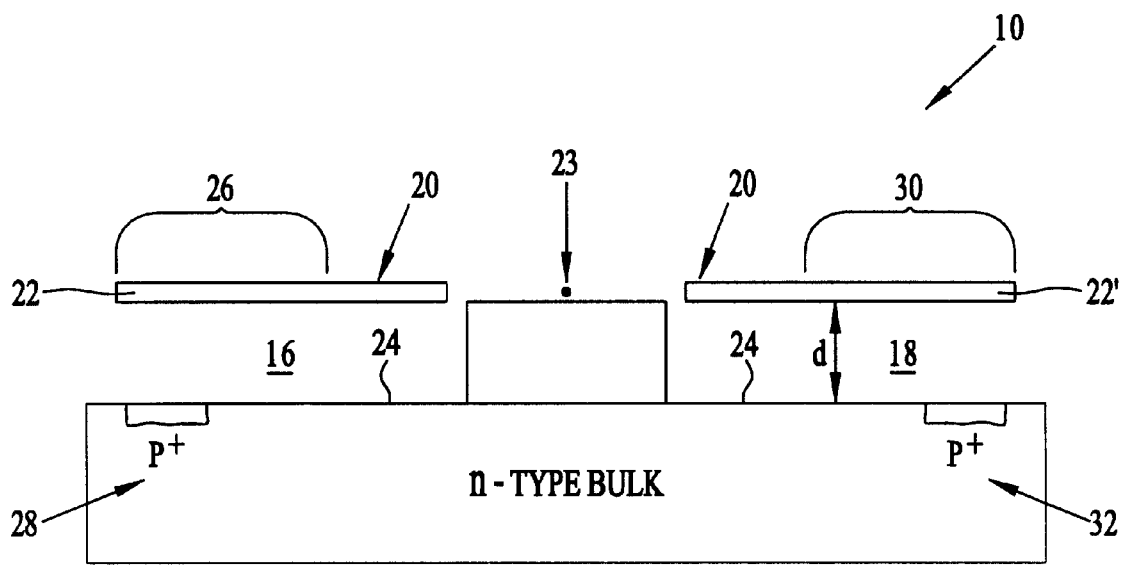
FIGS. 5A–5C are side-cross section views and a top view of an embodiment of the invention, respectively.
Figure 5B:
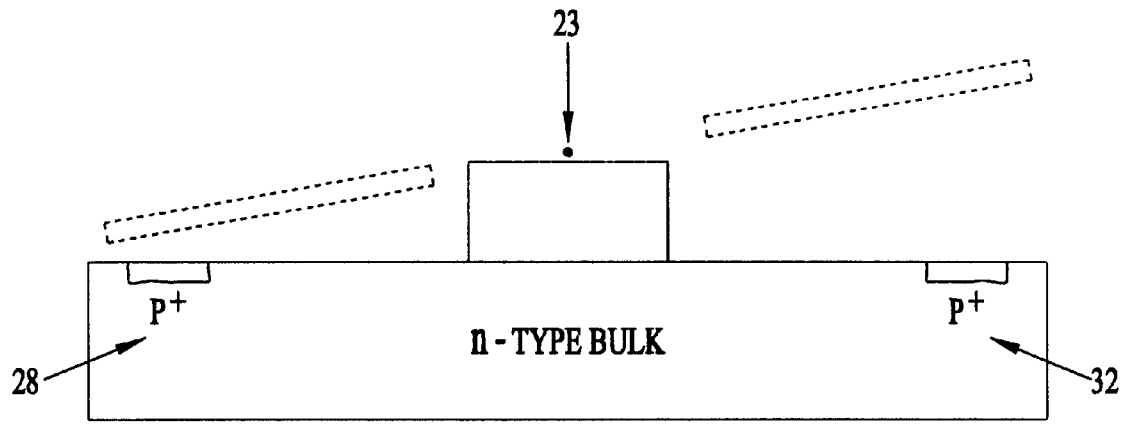
Figure 5C:
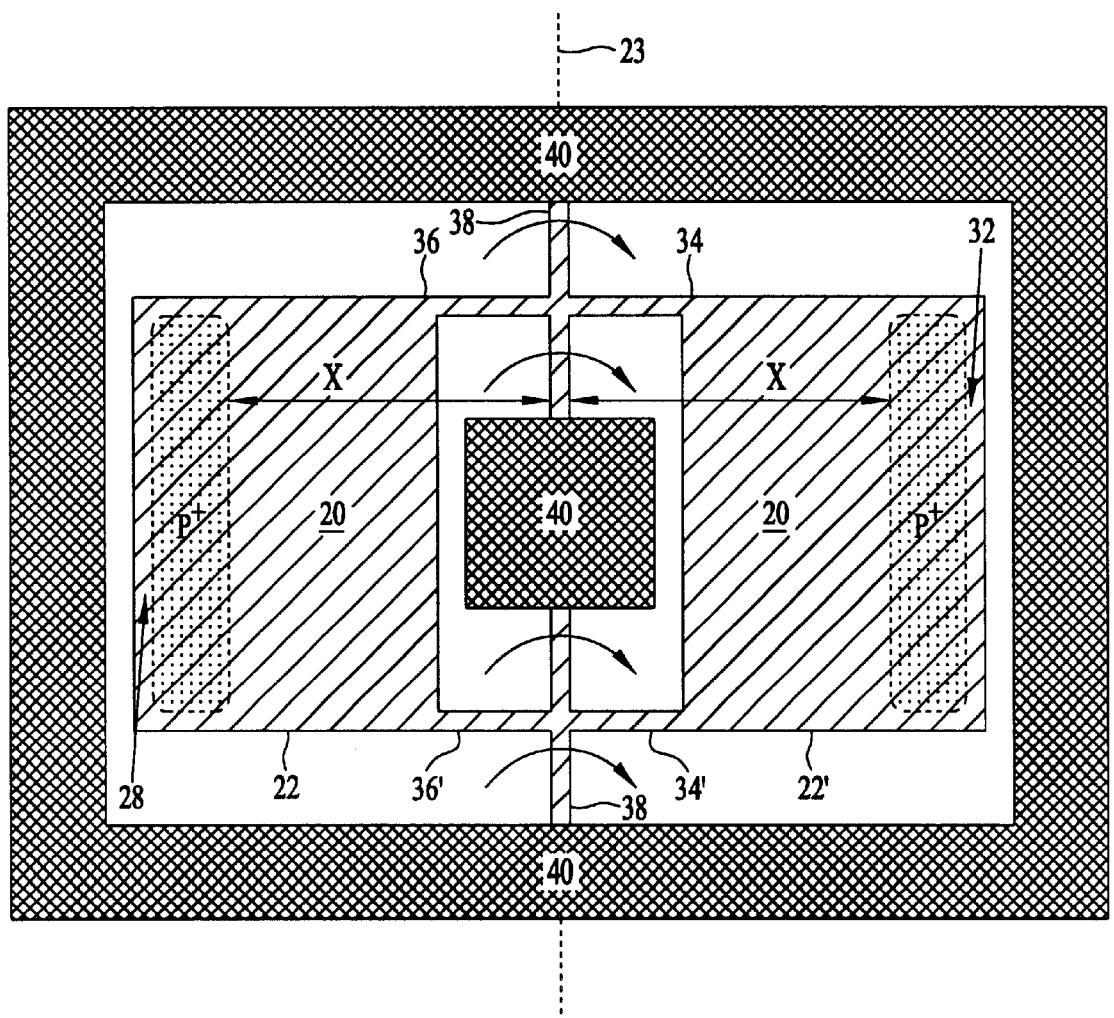

FIGS. 5A–5C illustrate one embodiment of the invention as seen from cross-sectional and top views, respectively. Referring to FIG. 5A, a gyroscope 10 includes an interferometer section having first and second Fabry-Perot interferometers 12 and 14. Interferometers 12 and 14 include etalons 16 and 18, respectively. Etalons 16 and 18 are bounded by a first partially transmissive, partially reflective surface 20 attached to radially extending transparent support 22 and 22' that also serve as a proof mass for the gyroscope. Surface 20 and transparent supports 22 make up an upper mirror of the gyroscope that is mounted to revolve around an axis 23 (shown also in FIG. 5C) with respect to a second partially transmissive, partially reflective surface 24 that is referred to as a lower mirror. Though "upper" and "lower" imply a certain orientation, these terms are merely used for convenience and the mirrors could assume any of a variety of orientations provided that one of these mirrors rotates with respect to the other around an axis parallel and spaced from the other mirror.

The nature of the mirrors themselves are of the type that is established in the art, and could be for example, a metallicized surface (a semi-transparent metal), dielectric stacks, an air-semiconductor interface, etc. In the embodiment illustrated, the upper mirror is a metallicized surface and the lower mirror is created via an silicon-air interface.

Light, as shown in FIG. 3, is irradiated upon the mirrors so that the light transmit cavities 16 and 18 passing through a first portion 26 of mirror 20 to be sensed by a first photosensor 28, in this instance a $p^+n$ photodiode. In basically symmetric fashion, irradiated light also passes through a second portion 30 of mirror 20 to be sensed by a second photosensor 32, in this instance a $p^+n$ photodiode.

The Fabry-Perot interferometers and photosensors lend themselves to being monolithically integrated on a single substrate. Though silicon has been referred to as an example substrate, other suitable substrate materials can be used such as Indium Phosphate, Galium Arsenide and the like. It is recognized that the term Fabry-Perot interferometer typically refers to a device containing two parallel, partially reflective, partially transmissive, surfaces as used here. In this description, this term is also used to describe the interferometers when one of these surfaces is tilted with respect to the other.

As previously mentioned, if monochromatic light is used to transmit the Fabry-Perot cavities, and the distance "d" (the airgap) between the top and bottom mirrors is an integral multiple of half wavelengths of the source light, a resonant condition will causes the transmission of light through the mirrors to be optimized. This distance is set so that as rotational forces sensed by gyroscope 10 cause mirrored surface 20 to rotate with respect to mirrored surface 24, light transmission is thereby either initially increased through etalon 16 of first interferometer 12 and decreased through etalon 18 of second interferometer 14 or initially decreased through etalon 16 of first interferometer 12 and increased through etalon 18 of second interferometer 14.

Though a laser, such as a solid state laser, may be used to provide the light irradiation, other light sources can be used such as light emitting diodes including organic light emitting diodes as well as light carried appropriately to the surfaces via fiber optic cable, for example.

Rotation of mirror 20 in one direction about axis 23 is shown in FIG. 5B. Though the rotation is illustrated in the counterclockwise direction from the perspective of this drawing, mirror 20 is also of course designed to rotate clockwise as from the perspective of this drawing. In either case, the light transmitting the cavities can be detected via photosensors 28 and 32.

FIG. 5C shows an embodiment of the invention as seen from the top. Upper mirror 20 (shown cross-hatched to indicate a transparent material) is depicted as rotating in one direction about axis 23, though of course rotation in the opposite direction is a design function. Mirror 20 has two sets of supporting arms 34 and 36 on either side of axis 23 to support portions 22 and 22' that back mirror 20. Also shown is axle 38 that is mounted for rotation to anchoring supports 40. Photodiodes 28 and 32 (shown in ghost lines) are integrated under the bottom mirror at some selected distance "x" from the rotational axis. The distance of the photosensors from the rotational axis as well as the photosensor's surface area will determine the sensitivity of the gyroscope. Additionally, comb structures at either of these two ends of the mirrors can be utilized to create a Coriolis Force induced rotational displacement.

Figure 6:
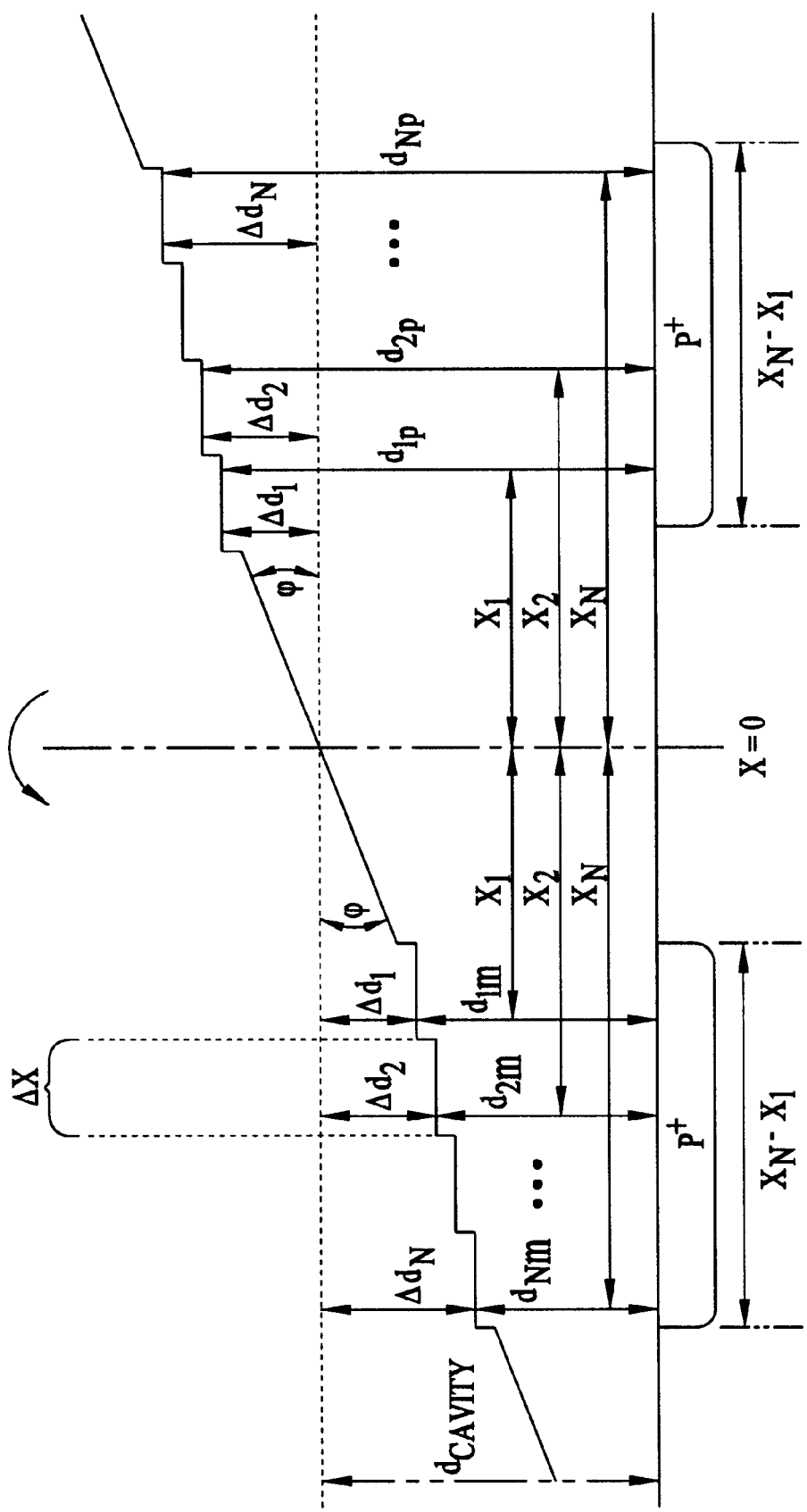
FIG. 6 describes how two non-parallel mirrors can be used to detect rotational motion and position.

The two mirrors as they rotate, however, will not be perfectly parallel with the bottom mirror as in the idealized case shown in FIG. 1. Referring to FIG. 6, the top mirror will be at a given angle to the bottom mirror, the amount of which is dependent, for example, upon the amplitude of the rotational acceleration. The system, however, can still be treated as an idealized Fabry-Perot cavity if small segments of width dx are used to calculate the distance between the mirrors and the resulting transmission coefficient. The total transmission of light into the photodiode can be calculated by summing the transmission contributions of a series of mirrors with finite width, dx, over the extent of the photodiode width. Each mirror element of width dx will have a different effective cavity length due to the angular displacement and therefore a different transmission coefficient.

By summing these transmission coefficients for each finite mirror element and normalizing by dividing by the total width of the photodiode, the overall transmission into the underlying photodiode can be obtained. The further the diode is away from the rotational axis, shown here projecting out/into the page, the greater the change in effective cavity distance for a given angular rotation. Therefore, the greater the distance between the rotational axis and the photodiode, the larger the percent change in the transmission of monochromatic light.

Figure 7:
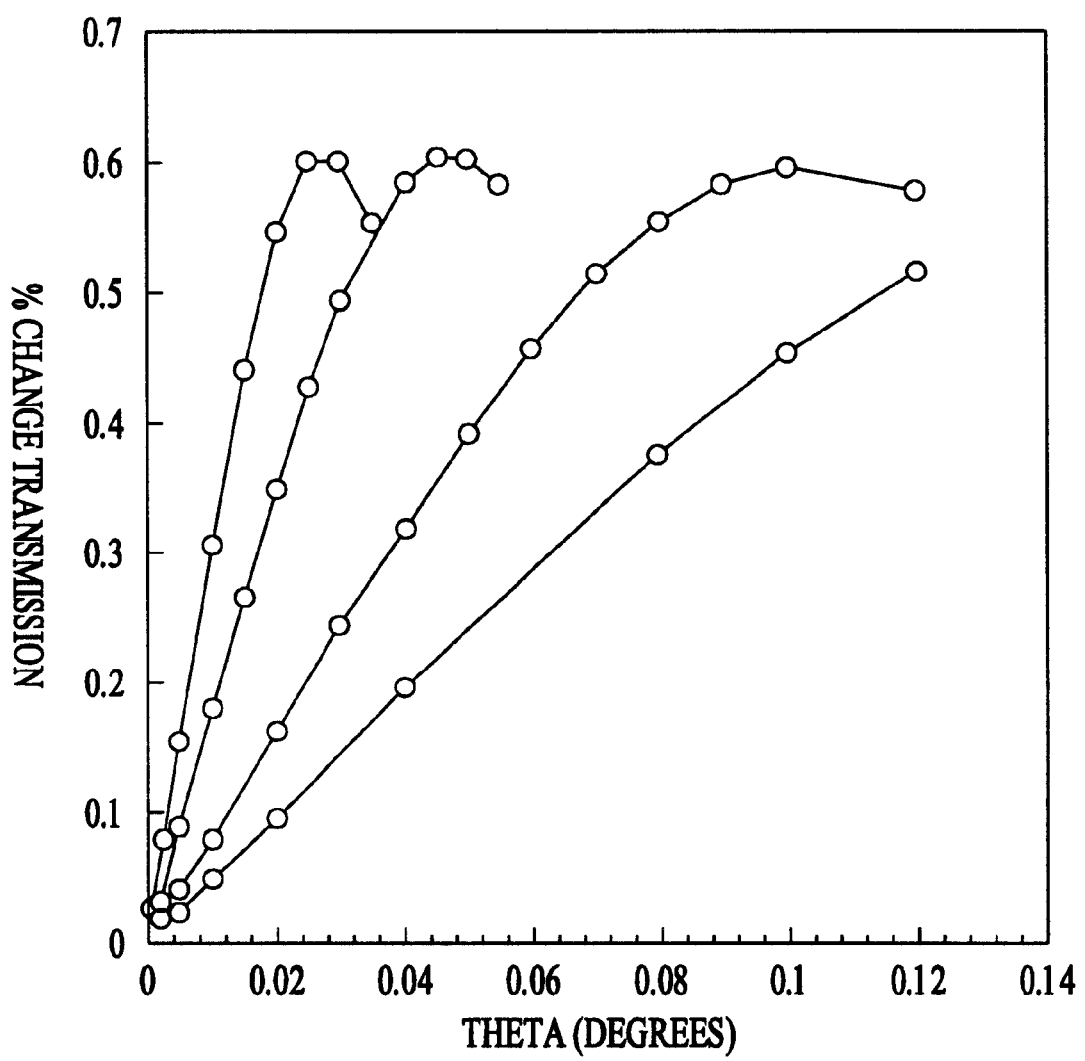
FIG. 7 shows the change in light transmission into a photodiode as a function of angular displacement about the rotational axis for a variety of photodiode widths.

FIG. 7 shows the change in transmission into the photodiode as a function of the angular displacement about the rotational axis for a fixed photodiode width (as measured from the rotational axis). Alternative sensitivity curves are shown generated for photodiodes of other widths.

Figure 8:
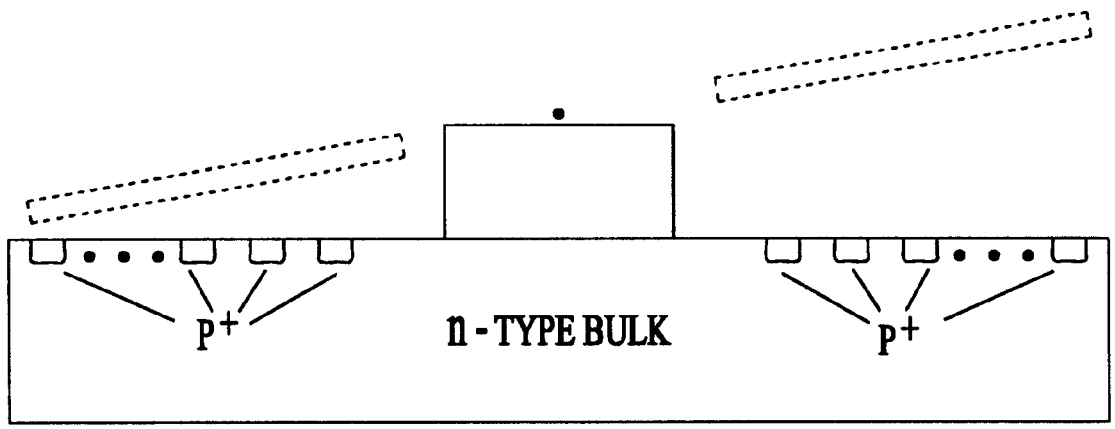
FIG. 8 is a cross-sectional view of another embodiment of the invention.

To increase the range of sensitivities for this novel optical gyroscope, a series of photodiodes can be integrated under the "bottom" mirror at a predetermined distance from and symmetric about the rotational axis as depicted in FIG. 8. By differentially amplifying equivalent sets of photodiodes a range of sensitivities can be extracted. In addition, sensors with a range of sensitivities can be arrayed to cover a wide rotational spectrum.

In contrast to the prior art, the invention utilizes optical resonance to detect angular displacement as opposed to capacitive pick-offs or piezo-electric sensors. The advantage of using light is twofold. First, due to its inherent small wavelength, and the resonance cavity affect, very small displacements in the upper mirror of the resonant cavity can be detected. Secondly, the use of photon-generated minority carriers well in excess of the thermally generated carriers greatly increases the Signal-to-Noise-Ratio (SNR).

Significantly, the invention can be treated as an active element since it has transistor-like characteristics. It possesses three terminals, one each for the upper mirror, the bottom mirror or $p^+$ region and one for the n-type bulk. It is similar to the operation of a bipolar junction transistor (BJT) in the sense that a third terminal, the upper mirror that is the analog of the emitter, varies the amount of minority carriers introduced into the depletion region of the $p^+n$ junction. The device is also similar in operation to the metal oxide semiconductor field effect transistor (MOSFET) since theoretically the gate (or upper mirror in this instance) voltage induces no leakage current into the $p^+$ region below due to the presence of a dielectric.

As demonstrated in FIG. 8, multiple photodiodes can be used to increase the range of sensitivity of the device. Therefore one device can be made with multiple operating ranges which would not ordinarily be possible with current capacitive methods.

The choice of initial cavity length that produces maximum sensitivity in the device is not unique. The open circles shown in FIG. 2 represents possible solutions for maximum sensitivity of the device. In addition, the curve and therefore the open circle solutions shown in FIG. 2 are dependent upon the choice of mirror structures chosen for both upper and lower mirrors.

This novel optical gyroscope is also monolithically integrable with an optical MEMS-based accelerometer that is the subject of a pending patent U.S. Ser. No. 09/808,570.

In addition, for particular embodiments, the processing of this novel gyroscope is integrable with standard complimentary metal oxide semiconductor (CMOS) processing techniques such that the control electronics can be integrated on the same substrate as the MEMS gyroscope, thus reducing size and weight even further over other MEMS-based gyroscopes.

Because of its high sensitivity levels, this novel resonant optical gyroscope can be made even smaller than other MEMS gyroscopes that utilize capacitive pickoffs to detect displacement.

With the aid of the above description, one of ordinary skill in the art will realize that a variety of alternative embodiments of the invention are possible. For example, various semiconductor materials can be used as the starting material to tailor the wavelength sensitivity or peak absorption spectra of the device, such as GaAs, Si, InP, etc.

Using various materials as dielectric stacks can alter reflectivity of the bottom and top mirrors. For example, to increase reflectiveness, alternating layers of silicon dioxide and silicon nitride can be used, each with a characteristic thickness that is based upon the wavelength of irradiating light. Other non-absorbing dielectric layers can also be used to create both the upper and lower mirrors. Deposition of thin metal layers, for example, can be used to tailor the reflectivity of the upper and lower mirrors.

If the finesse of the cavity is low enough based upon the predetermined mirror structures, a light emitting diode (LED) light source can be used. In addition, Organic Light Emitting Diodes or OLEDs can be deposited directly onto the upper mirror of the Fabry-Perot resonant cavity for use as a light source.

Based upon the choice of starting material, e.g. GaAs or other equivalent light emitting substrate, either a LED or LASER diode can be monolithically integrated with the Fabry-Perot resonant cavity and photodiode.

The laser diode or alternative light source can be wafer bonded to the substrate containing the combination of the resonant cavity and photodiode.

A fiber optic light source may be used to bring light in from an external source.

Wafer bonding techniques and patterning can be used to increase the mass and moment of inertia about the rotational axis as is done with capacitive based MEMS gyroscopes.

Figure 9:
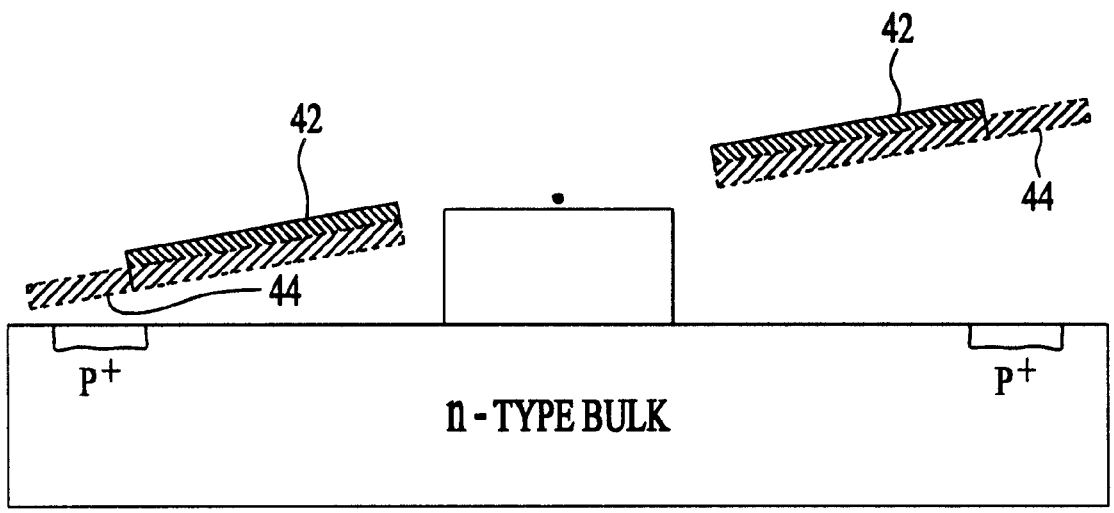
FIG. 9 is a cross-sectional view depicting how additional weights can be used to increase the proof mass as used with the invention.

Alternative deposition techniques can be used to increase the inertial mass. In addition, various materials 42 can be deposited onto the upper mirror provided that transparent or semitransparent openings 44 remain to allow the photodiode(s) to be illuminated from above as shown in FIG. 9. Although this rotational sensor has been described in one axis, it is to be understood that individual rotational sensors can be placed at any axis or any combination of the x, y and z axes.

Various structures to detect rotation can be used other than those depicted in FIGS. 1–9, that are still in line with the inventive concept that, for a given structure used to measure rotation, an optical resonant cavity and a photosensor are integrated to detect angular displacement as opposed to the prior art which uses passive capacitive methods for displacement detection. In this spirit, it can be envisioned that a single ended design with only one resonant cavity can also be used.

Obviously, many modifications and variations of the invention are possible in light of the above description. It is therefore to be understood that within the scope of the claims, the invention may be practiced otherwise than as has been specifically described.

What is claimed is:

1. A high sensitivity micro-electro-mechanical optical gyroscope comprising:

an interferometer section, including a pair of partially transmissive, partially reflective, surfaces wherein a first of said surfaces is disposed to rotate with respect to a second of said surfaces about an axis that is spaced apart from and parallel to said second surface so that an even gap exists between said surfaces when said surfaces are parallel, said first surface having first and second portions extending radially oppositely from said axis;

a proof mass attached to said rotatably disposed first surface;

a source of monochromatic light, said light for irradiating through said first and second surfaces wherein said light is also partially reflected between said surfaces;

a first photosensor for sensing said light as projected through said first portion of said first surface and said second surface; and a second photosensor for sensing said light as projected through said second portion of said first surface and through said second surface, wherein said gap is set so that rotational forces as sensed by said gyroscope cause said first surface to rotate with respect to said second surface thereby either initially increasing light transmission through said first surface's first portion and said second surface and decreasing light transmission through said first surface's second portion and said second surface or initially decreasing light transmission through said first surface's first portion and said second surface and increasing light transmission through said first surface's second portion and said second surface.

2. The apparatus of claim 1 wherein said interferometer section and said photosensors are monolithically integrated on a single substrate.

3. The apparatus of claim 1 wherein said interferometer section and said photosensors are monolithically integrated on a silicon substrate.

4. The apparatus of claim 1 wherein said interferometer section and said photosensors are monolithically integrated on an Indium Phosphate substrate.

5. The apparatus of claim 1 wherein said interferometer section and said photosensors are monolithically integrated on a Galium Arsenide substrate.

6. The apparatus of claim 1 wherein said first partially transmissive, partially reflective surface is a semi-transparent metal.

7. The apparatus of claim 6 wherein said second partially transmissive, partially reflective surface is a semi-transparent metal.

8. The apparatus of claim 2 wherein said first partially transmissive, partially reflective surface is a semi-transparent metal and said second partially transmissive, partially reflective surface is an air/semiconductor interface.

9. The apparatus of claim 2 wherein said second partially transmissive, partially reflective surface is an air/semiconductor interface.

10. The apparatus of claim 1 wherein said partially reflective, partially transmissive, surfaces are dielectric mirrors.

11. The apparatus of claim 1 wherein said interferometer section includes a Fabry-Perot interferometer.

12. The apparatus of claim 1 wherein said photosensors are photodiodes.

13. The apparatus of claim 12 wherein said photodiodes are p$^+$n silicon photodiodes.

14. The apparatus of claim 1 wherein said first and second photosensors each include a plurality of independent sensors for individually sensing light as transmitted through said first and second surfaces.

15. The apparatus of claim 1 wherein said source of monochromatic light is a laser.

16. The apparatus of claim 15 wherein said laser is a solid-state laser.

17. The apparatus of claim 1 wherein said source of monochromatic light is a light emitting diode.

18. The apparatus of claim 17 wherein said light emitting diode is an organic light emitting diode.

19. The apparatus of claim 1 wherein said photosensors are attached to said first surface.

20. The apparatus of claim 1 wherein said photosensors are attached to said second surface.

21. The apparatus of claim 1 wherein said interferometer section includes first and second Fabry-Perot interferometers, wherein an etalon of said first Fabry-Perot interferometer includes said first portion of said first surface and said second surface and wherein an etalon of said second Fabry-Perot interferometer includes said second portion of said first surface and said second surface.

22. A high sensitivity micro-electromechanical optical gyroscope comprising:

an interferometer section, including a pair of partially transmissive, partially reflective, surfaces wherein a first of said surfaces is disposed to rotate with respect to a second of said surfaces about an axis that is spaced apart from and parallel to said second surface so that an even gap exists between said surfaces when said surfaces are parallel, said first surface having first and second portions extending radially oppositely from said axis, said interferometer section including first and second Fabry-Perot interferometers, wherein an etalon of said first Fabry-Perot interferometer includes said first portion of said first surface and said second surface and wherein an etalon of said second Fabry-Perot interferometer includes said second portion of said first surface and said second surface;

a proof mass attached to said rotatably disposed first surface;

a source of monochromatic light, said light for irradiating through said first and second surfaces wherein said light is also partially reflected between said surfaces;

a first photodiode attached to said second surface outside of said gap for sensing said light as projected through said etalon of said first Fabry-Perot interferometer; and a second photodiode attached to said second surface outside of said gap for sensing said light as projected through said second Fabry-Perot interferometer, wherein said gap is set so that rotational forces as sensed by said gyroscope cause said first surface to rotate with respect to said second surface thereby either initially increasing light transmission through said etalon of said first Fabry-Perot interferometer and decreasing light transmission through said etalon of said second Fabry-Perot interferometer or initially decreasing light transmission through said etalon of said first Fabry-Perot interferometer and increasing light transmission through said etalon of said second Fabry-Perot interferometer.

23. The apparatus of claim 22 wherein said interferometers and said photodiodes are monolithically integrated on a silicon substrate.

24. The apparatus of claim 23 wherein said first partially transmissive, partially reflective surface is a semi-transparent metal.

25. The apparatus of claim 24 wherein said second partially transmissive, partially reflective surface is a semi-transparent metal.

26. The apparatus of claim 24 wherein said second partially transmissive, partially reflective surface is an air/semiconductor interface.

27. The apparatus of claim 26 wherein said photodiodes are p$^+$n silicon photodiodes.

28. The apparatus of claim 26 wherein said first and second photodiodes are of first and second pluralities of independent photodiodes spaced at varying distances from said axis to individually sense light as transmitted through said first and second etalons, respectively.

* * * * *